US010943365B2

(12) United States Patent
Chu et al.

(10) Patent No.: US 10,943,365 B2
(45) Date of Patent: Mar. 9, 2021

(54) METHOD AND SYSTEM OF VIRTUAL FOOTWEAR TRY-ON WITH IMPROVED OCCLUSION

(71) Applicant: National Tsing Hua University, Hsinchu (TW)

(72) Inventors: Chih-Hsing Chu, Hsinchu (TW); Han-Sheng Wu, Hsinchu (TW); Chia-Chen Kuo, Hsinchu (TW)

(73) Assignee: KNERON, INC., San Diego, CA (US)

( * ) Notice: Subject to any disclaimer, the term of this patent is extended or adjusted under 35 U.S.C. 154(b) by 70 days.

(21) Appl. No.: 16/393,066

(22) Filed: Apr. 24, 2019

(65) Prior Publication Data
US 2020/0065991 A1    Feb. 27, 2020

(30) Foreign Application Priority Data

Aug. 21, 2018    (TW) .................................. 10712913.0

(51) Int. Cl.
*G06T 7/73*    (2017.01)
*G06T 19/00*    (2011.01)

(52) U.S. Cl.
CPC ............... *G06T 7/75* (2017.01); *G06T 7/74* (2017.01); *G06T 19/006* (2013.01); *G06T 2219/012* (2013.01)

(58) Field of Classification Search
CPC ........... G06T 7/75; G06T 19/006; G06T 7/74; G06T 2219/012; G06T 2207/20212;
(Continued)

(56) References Cited

U.S. PATENT DOCUMENTS

| 5,911,126 A  * | 6/1999 | Massen ................. A43D 1/025 702/153 |
| 2006/0104503 A1* | 5/2006 | Huang ................. A61B 5/0064 382/154 |

(Continued)

FOREIGN PATENT DOCUMENTS

| CN | 102930447 A | 2/2013 |
| CN | 103489214 A | 1/2014 |
| TW | 201627950 A | 8/2016 |
| TW | 201805771 A | 2/2018 |
| WO | WO2006/134037 A1 | 12/2006 |

OTHER PUBLICATIONS

Chih-Hsing Chu, Chin-Hung Cheng, Han-Sheng Wu, and Chia-Chen Kuo, Proceedings of the ASME 2018 International Design Engineering Technical Conferences & Computers and Information in Engineering Conference, Aug. 26-29, 2018, Quebec City, Quebec, Canada, 7 pages.

(Continued)

*Primary Examiner* — Nimesh Patel
(74) *Attorney, Agent, or Firm* — Muncy, Geissler, Olds & Lowe, P.C.

(57) ABSTRACT

A method and system of virtual footwear try-on with improved occlusion processing are disclosed. The method comprises: capturing a foot image of a user; defining an ankle joint point in the foot image and defining at least one reference point according to the ankle joint point; capturing depth point data within a spatial range around the reference point and constructing an occlusion model according to the depth point data; positioning the occlusion model to a position corresponding to the foot image to obtain an occlusion processed image; positioning the footwear model on the occlusion processed image to produce a matching image of the footwear model and the foot; and hiding the occlusion model.

12 Claims, 23 Drawing Sheets

(58) Field of Classification Search
CPC ... G06T 2207/10024; G06T 7/33; G06T 7/73;
G06T 13/40; G06T 19/003; G09B
19/0038; G09B 19/003; G09B 19/00;
G06K 9/00342; G06K 9/00355; G06K
9/00671; G06K 19/25; G06K 9/228;
G06K 9/4604; G06K 9/4633; G06K
9/4671; G06K 9/6205; G06K 9/6277;
G06K 9/78; G06K 9/00805; G06K
9/2018; G06K 9/00496; G06F 1/163;
G06F 3/017; G06F 3/00; G06F 3/011;
G06F 2203/012; G06F 3/014; G06F
30/00; G06F 30/20; G06F 16/28; G06F
16/3329; G06F 16/9537; G06F 21/32;
G16H 20/30; G16H 50/20; G16H 40/63;
G16H 40/67; G16H 30/20; G16H 50/50;
G06N 20/00; G06N 7/005; G06N 5/04;
G06N 20/20; G06N 3/0454; G06N 3/088;
G06N 5/025; G06N 5/046; A63F 13/5255
See application file for complete search history.

(56) References Cited

U.S. PATENT DOCUMENTS

| | | | | |
|---|---|---|---|---|
| 2006/0277772 | A1* | 12/2006 | Pupko | A43D 1/06 33/3 R |
| 2009/0183389 | A1* | 7/2009 | Miller | A43B 7/1445 36/43 |
| 2013/0307851 | A1* | 11/2013 | Hernandez Stark | G06T 17/00 345/420 |
| 2017/0053335 | A1* | 2/2017 | Hanscom | G06Q 10/067 |
| 2019/0139252 | A1* | 5/2019 | Zaiss | A43D 1/025 |

OTHER PUBLICATIONS

Chih-Hung Cheng, "An Advanced Study on Virtual Footwear Try-On in Augmented Reality" Institute of Industrial Engineering and Engineering Management, National Tsing Hua University (Taiwan), Thesis, 2016, 72 pages.

* cited by examiner

METHOD AND SYSTEM OF VIRTUAL FOOTWEAR TRY-ON WITH IMPROVED OCCLUSION

CROSS REFERENCE TO RELATED APPLICATIONS

This Non-provisional application claims priority under 35 U.S.C. § 119(a) on Patent Application No(s). 107129130 filed in Taiwan, Republic of China on Aug. 21, 2018, the entire contents of which are hereby incorporated by reference.

BACKGROUND

Technology Field

The present disclosure relates to a method and system of virtual footwear try-on with improved occlusion.

Description of Related Art

In recent years, the augmented reality (AR) technology has been developed and applied in the fields of entertainment, industry, education, and the likes. In the field of shopping, by utilizing the augmented reality technology, it is possible to try on the wearable products, such as clothing, accessories, shoes, etc., virtually through mobile phones, tablets, computers, sensors and other devices. The virtual try-on system can overcome the problem of insufficient storage space, reduce the amount of inventory, and shorten the time for consumers to try different products. This technology not only can facilitate the shopping process of customers, but also save the labor and inventory costs of the store. For example, in the physical shoe storefront, when consumers want to try on the shoes, they need to inform the clerk to fetch a product in stock, and the time and labor cost are quite considerable. Therefore, to provide the related virtual footwear try-on system can save the above-mentioned labor and time costs, and provide customers with a better shopping experience.

With the maturity of mobile devices and the development of augmented reality hardware, mobile devices with augmented reality functions have gradually become popular, and the virtual try-on technology has been transplanted to mobile devices. Accordingly, the virtual try-on of shoes can also be realized through the mobile tablet device, so that the consumers can perform virtual try-on at any time and place, thereby enhancing the convenience of online shopping, and shortening the gap between the real product and the expectation.

In the virtual try-on application, due to limitations on the hardware devices, the sensors made of different manufacturers have functional differences, and the stabilities and accuracies of the information captured by the sensors have certain restrictions. Therefore, in the development of virtual try-on functions, the priority should be given to the accuracy and interaction of virtual and real objects and scenes, and the fidelity of virtual objects. Virtual goods, such as clothing, shoes, etc., need to be closely attached to the body when wearing, so that the fitness and the accuracy of the wearing position significantly affect the user's visual experience, including whether the size of the clothes conforms to the user's body, and whether the product correspondingly changes its geometry following the posture of the user during the try-on process. In addition, since the products for virtual try-on are shown as virtual models, the rendering of the graphics and the degree of simulation of the model can also affect the user's experience. Through the high-fidelity texture rendering method and the processing of light and shadow effects, the virtual object can be presented close to the real object.

In the previous studies on virtual try-on technology in augmented reality, a fixed and simple geometric model was used as the reference for occlusion processing. Since the body size and shape of individual users can be very different, the use of a fixed geometric model may cause errors in the occlusion processing, resulting in a visual defect in the virtual try-on experience.

Taking the virtual footwear try-on system as an example, please refer to FIG. 1A and FIG. 1B, which are different schematic diagrams of the occlusion effects of the conventional virtual footwear try-on system. In the conventional virtual footwear try-on system, only a simple geometric cylindrical model is used in the occlusion process, and is fixedly placed at the ankle position. This occlusion processing method can only produce a satisfactory occlusion effect when the geometric relationship between the user's foot and the ankle joint is fixed. However, since the user moves the feet to different angles and orientations while performing the footwear try-on, the relative angle and orientation between the foot and the ankle joint will also change. The occlusion process, using only the fixed occlusion object, cannot satisfy these conditions, and will result in an unnatural visual experience. For example, in the areas A1 and A2 of FIG. 1A and FIG. 1B, the merge of the ankle and the virtual footwear model will show a noticeable gap, and a part of the ankle is mistakenly obscured by the virtual footwear.

Therefore, in virtual footwear try-on application in augmented reality, the occlusion processing technology is an essential element for enhancing the user's try-on experience, and the natural overlapping of the virtual footwear and the human body will affect the quality of user's virtual try-on experience.

SUMMARY

The present disclosure is to provide a method and system of virtual footwear try-on with improved occlusion, which is applied in augmented reality. The disclosure can improve the mutual occlusion effect between the virtual footwear model and the ankle joint in the conventional virtual footwear try-on system, thereby improving the visual quality of the virtual footwear try-on experience.

To achieve the above objective, the present disclosure provides a method of virtual footwear try-on with improved occlusion processing, which is applied to augmented reality. The method comprises steps of: capturing a foot image of a user; defining an ankle joint point in the foot image and defining at least a reference point of the foot of the user by extending from the ankle joint point toward a direction with at least a distance, wherein the direction is an extension direction from the ankle joint point to a calf of the user; capturing depth point data within a spatial range around the reference point and establishing an occlusion model according to the depth point data; positioning the occlusion model to a position corresponding to the foot image to obtain an occlusion processed image comprising the foot of the user; positioning a footwear model on the occlusion processed image to produce a matching image of the footwear model and the foot of the user; and hiding the occlusion model according to a relative position.

To achieve the above objective, the present disclosure also provides a system of virtual footwear try-on with improved occlusion, which is applied to an augmented reality. The system comprises an image capturing device and an electronic device. The electronic device comprises one or more processing units and a memory unit. The one or more processing units are electrically connected with the image capturing device and the memory unit, and the memory unit stores one or more program instructions. When the one or more processing units execute the one or more program instructions, the one or more processing units perform: capturing a foot image of a user; defining an ankle joint point in the foot image and defining at least a reference point of the foot of the user by extending from the ankle joint point toward a direction with at least a distance, wherein the direction is an extension direction from the ankle joint point to a calf of the user; capturing depth point data within a spatial range around the reference point and establishing an occlusion model according to the depth point data; positioning the occlusion model to a position corresponding to the foot image to obtain an occlusion processed image comprising the foot of the user; positioning a footwear model on the occlusion processed image to produce a matching image of the footwear model and the foot of the user; and hiding the occlusion model according to a relative position.

In one embodiment, the step of defining the ankle joint point in the foot image comprises: matching a virtual foot model onto the foot image to obtain a virtual foot model translation matrix and a virtual foot model rotation matrix of the virtual foot model corresponding to the foot image, thereby obtaining a position of a foot of the user in a spatial coordinate system; and defining a coordinate point of an ankle joint of the virtual foot model in the spatial coordinate system, wherein the coordinate point corresponds to the ankle joint point of the user.

In one embodiment, the spatial range is a sphere, and a radius of the sphere is greater than or equal to the distance.

In one embodiment, the reference point is a center of the sphere, and the step of establishing the occlusion model comprises: capturing the depth point data within the sphere; and obtaining the occlusion model according to the depth point data within the sphere.

In one embodiment, the reference point comprises an upper reference point and a lower reference point, the upper reference point is a center of an upper sphere, and the lower reference point is a center of a lower sphere. The step of establishing the occlusion model comprises: obtaining the upper depth point data and lower depth point data from the upper sphere and the lower sphere, respectively; retrieving a part of the upper depth point data and a part of the lower depth point data having a distance away from the upper reference point and the lower reference point, respectively, less than or equal to a threshold value to obtain upper reference point depth data and lower reference point depth data; obtaining an upper center point and an lower center point according to the upper reference point depth data and the lower reference point depth data, respectively; defining axes of rotation coordinates of the calf of the user according to the upper center point and the lower center point; and calculating a rotation matrix of a current calf axis of the user and establishing the occlusion model for the user according to the rotation matrix and a translation matrix for tracking a foot position of the user.

In one embodiment, a radius of the upper sphere is greater than or equal to a distance between the upper reference point and the lower reference point, and a radius of the lower sphere is greater than or equal to a distance between the upper reference point and the lower reference point.

In one embodiment, the axes of the rotation coordinates comprise an X axis, a Y axis and a Z axis, a line from the upper center point to the lower center point is defined as the Y axis, a forward direction of the foot of the user is defined as the Z axis, and the X axis is defined as a direction perpendicular to the Y axis and the Z axis.

In one embodiment, the step of positioning the occlusion model to the position corresponding to the foot image is performed according to an equation of:

$$P_{after} = T_{foot} * R_{foot} * R_{calf} * P_{before}$$

Wherein, $P_{after}$ is an occlusion model of the current calf axis of the user, $P_{before}$ is an occlusion model of an initial calf axis of the user, $R_{calf}$ is a rotation matrix as a calf axis of the user rotates from an initial standing position to a current position, $R_{foot}$ is a rotation matrix of the foot direction of the user, and $T_{foot}$ is a translation matrix of the foot position of the user.

In one embodiment, the occlusion model comprises a first partial occlusion model and a second partial occlusion model, the first partial occlusion model is a geometric model of the ankle joint of the user, and the second partial occlusion model is a geometric model of a calf portion above the angle joint of the user.

As mentioned above, the method and system of virtual footwear try-on with improved occlusion of this disclosure can define an ankle joint point of the user in the foot image, define at least one reference point of the foot of the user according to the ankle joint point, capture depth point data within a spatial range around the reference point, and establish an occlusion model according to the depth point data. Afterwards, the method and system of virtual footwear try-on with improved occlusion of this disclosure further positions the occlusion model to a position corresponding to the foot image, positions the footwear model on the occlusion processed image to produce a matching image of the footwear model and the foot, and hides a part of the occlusion model according to a relative position. Accordingly, the method and system of this disclosure can correctly show the edge of the occlusion of the virtual and real objects, thereby improving the mutual occlusion effect between the virtual footwear model and the ankle joint, increasing the natural interaction between the virtual footwear and the ankle joint, enhancing the visual effect of the virtual footwear try-on experience, and making the user have a more realistic try-on experience.

BRIEF DESCRIPTION OF THE DRAWINGS

The disclosure will become more fully understood from the detailed descriptions and associated drawings, which are given for illustration only, and thus are not limitative of the present disclosure, and wherein.

DETAILED DESCRIPTION OF THE DISCLOSURE

The present disclosure will be apparent from the following detailed description, which proceeds with reference to the associated drawings, wherein the same references relate to the same elements.

Figure 2A:
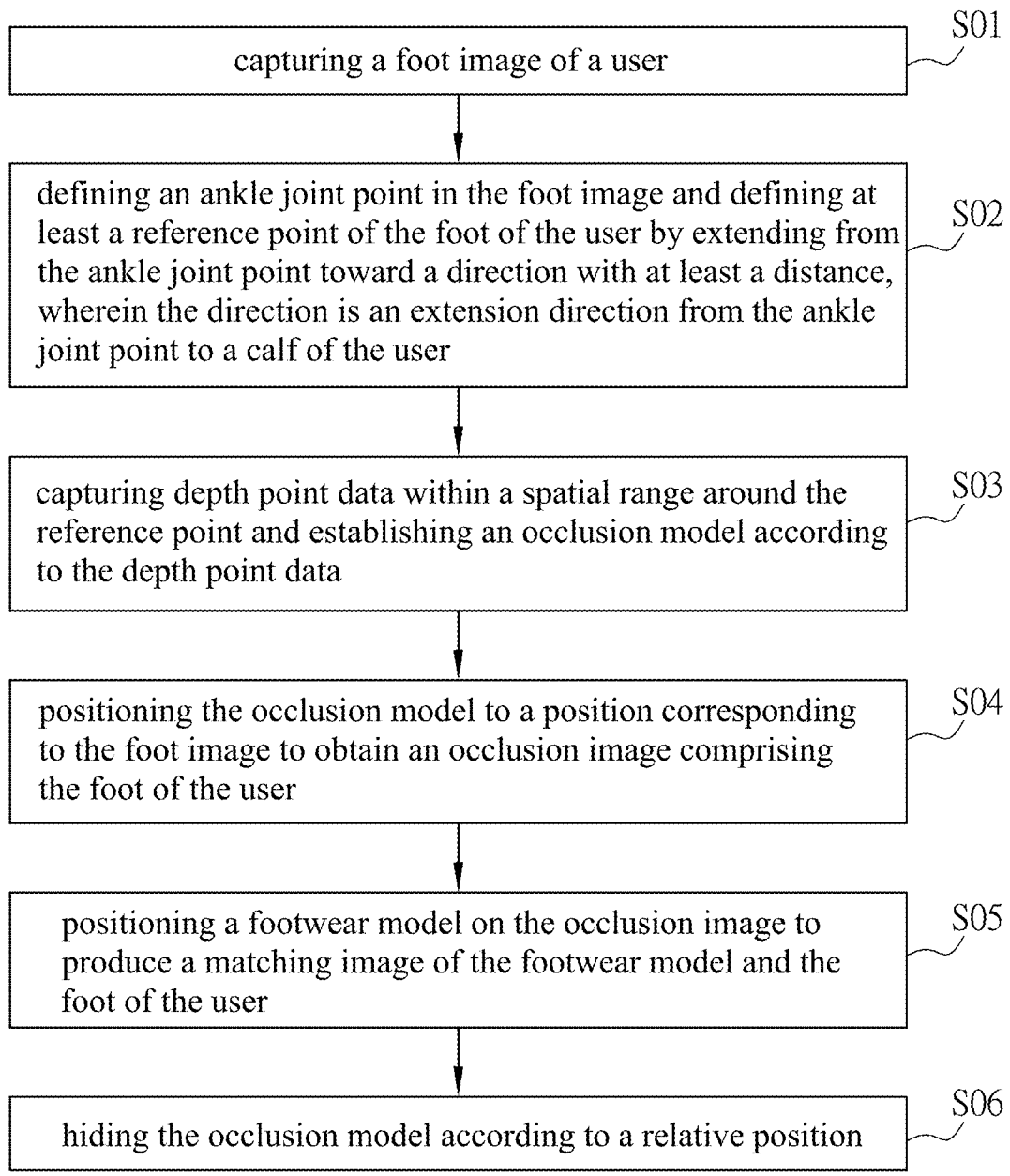
FIG. 2A is a flow chart of a method of virtual footwear try-on with improved occlusion.
Figure 2B:
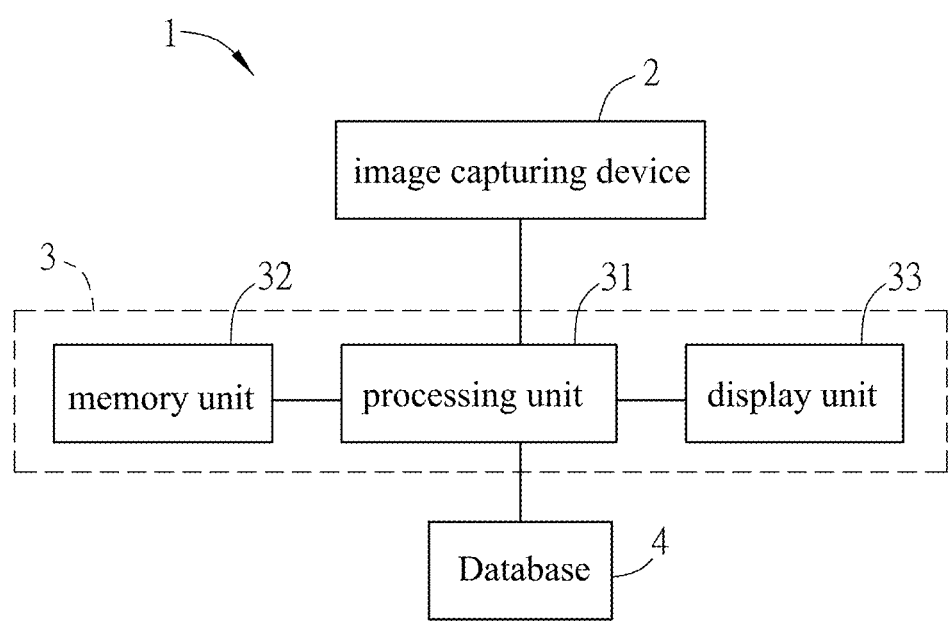
FIG. 2B is a functional block diagram showing a system of virtual footwear try-on with improved occlusion processing.

FIG. 2A is a flow chart of a method of virtual footwear try-on with improved occlusion processing, and FIG. 2B is a functional block diagram showing a system of virtual footwear try-on with improved occlusion processing.

The method and system of the virtual footwear try-on with improved occlusion processing of this disclosure are applied to footwear try-on function in augmented reality (AR), which can improve the fit between the occlusion model and human foot, and enhance the accuracy of the merge between the virtual object and the real human body. By using the method and system of the disclosure, the boundaries of the occlusion of the virtual and real objects can be correctly displayed, thereby improving the mutual occlusion effect between the ankle joint part and the try-on footwear model in 3D computer graphics, increasing the natural interaction between the virtual footwear and the ankle joint, enhancing the visual quality of the virtual footwear try-on experience, and improving the user experience of the virtual try-on.

As shown in FIG. 2A, the method of virtual footwear try-on with improved occlusion of this disclosure comprises steps of: capturing a foot image of a user (step S01); defining an ankle joint point in the foot image and defining at least a reference point of the foot of the user by extending from the ankle joint point toward a direction with at least a distance, wherein the direction is an extension direction from the ankle joint point to a calf of the user (step S02); capturing depth point data within a spatial range around the reference point and establishing an occlusion model according to the depth point data (step S03); positioning the occlusion model to a position corresponding to the foot image to obtain an occlusion processed image comprising the foot of the user (step S04); positioning a footwear model on the occlusion processed image to produce a matching image of the footwear model and the foot of the user (step S05); and hiding the occlusion model according to a relative position (step S06).

Referring to FIG. 2B, the system 1 of virtual footwear try-on with improved occlusion processing comprises an image capturing device 2 and an electronic device 3. The image capturing device 2 is electrically connected with the electronic device 3. In this embodiment, the image capturing device 2 may be electrically wired to the electronic device 3 through, for example, transmission lines, or may be wirelessly connected with the electronic device 3 through, for example, the Wi-Fi module, Bluetooth module, telecommunication module (e.g. 3G or 4G). Of course, the image capturing device 2 can electrically connected with the electronic device 3 by other methods, and this disclosure is not limited. In the following embodiment, the image capturing device 2 is, for example but not limited to, a Kinect depth camera.

The electronic device 3 can be, for example but not limited to, a mobile electronic device (e.g. a mobile phone, a tablet or a notebook computer) or a stationary electronic device (e.g. a desktop computer or a server), and this disclosure is not limited. The electronic device 3 includes one or more processing units 31 and a memory unit 32. In addition, the electronic device 3 further includes a display unit 33. The one or more processing units 31 can be electrically connected to the memory unit 32 and the display unit 33 through, for example, a Bus. For example, FIG. 2B shows one processing unit 31 and one memory unit 32.

The processing unit 31 can access the data stored by the memory unit 32 for performing an operation or a control, and control the display unit 33 to display the corresponding image. The processing unit 31 may include a core control assembly of the electronic device 3, which for example includes at least one CPU and a memory, or includes other control hardware, software, or firmware. In addition, the memory unit 32 stores at least one application software, which is for example but not limited to an APP software or a computer executable application software including one or more program instructions. When the program instructions of the one or more application software are executed by the one or more processing units 31, the one or more processing units 31 may at least perform the operations of the above-mentioned steps S01 to S06.

In this embodiment, the memory unit 32 can be a non-transitory computer readable storage medium, such as at least one memory, a memory card, a CD, a video tape, a computer tape, or any combination thereof. The memory may include read only memory (ROM), flash memory, or a field-programmable gate array (FPGA), or other kinds of memory, or a combination thereof. In this case, the memory unit 32 is exemplified by an internal memory of a mobile electronic device or a stationary electronic device. However, in different embodiments, the memory unit 32 can also be a cloud memory and stored in the cloud device. In other words, the application software can also be stored in the cloud device, and the user can download the application software into the electronic device 3 from the cloud device. In addition, the display unit 33 can be a display panel or display of a mobile electronic device or a stationary electronic device, which is, for example but not limited to, an LCD, an OLED display, an LED display, or other displays capable of displaying images. The display unit 33 can be configured to display the try-on image, so that the user can view the effect of the virtual footwear try-on.

The method and the system 1 of virtual footwear try-on with improved occlusion will be further described in the following different embodiments.

FIGS. 3A to 3G are schematic diagrams showing the procedures of the method of virtual footwear try-on with improved occlusion according to a first embodiment.

Figure 3A:
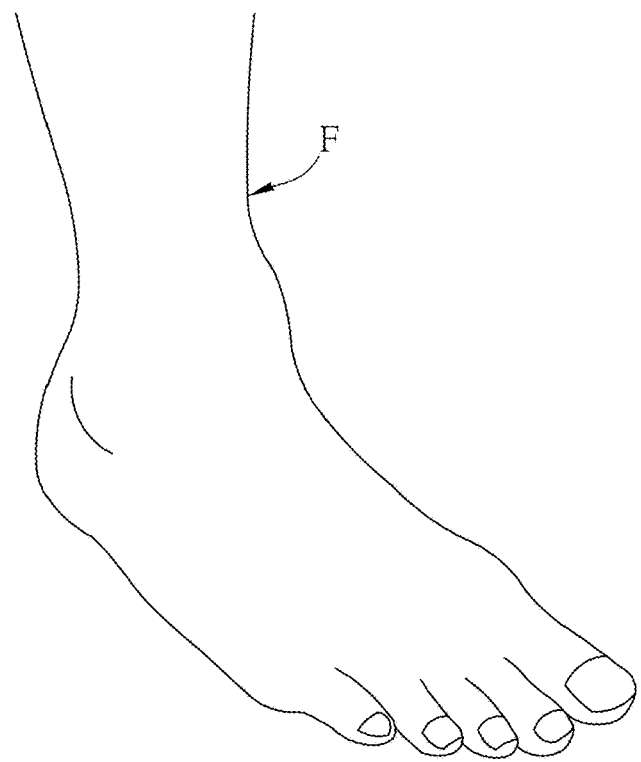
FIGS. 3A to 3G are schematic diagrams showing the procedures of the method of virtual footwear try-on with improved occlusion processing according to a first embodiment.

Referring to FIGS. 2A and 2B in view of FIGS. 3A to 3G the first embodiment shows that the improved occlusion can be achieved based on the foot depth data point. As shown in FIG. 2A, the first step is to capture a foot image F of a user (step S01). As shown in FIG. 3A, the image capturing device 2 is operated to capture a foot image F of a user.

Figure 3B:
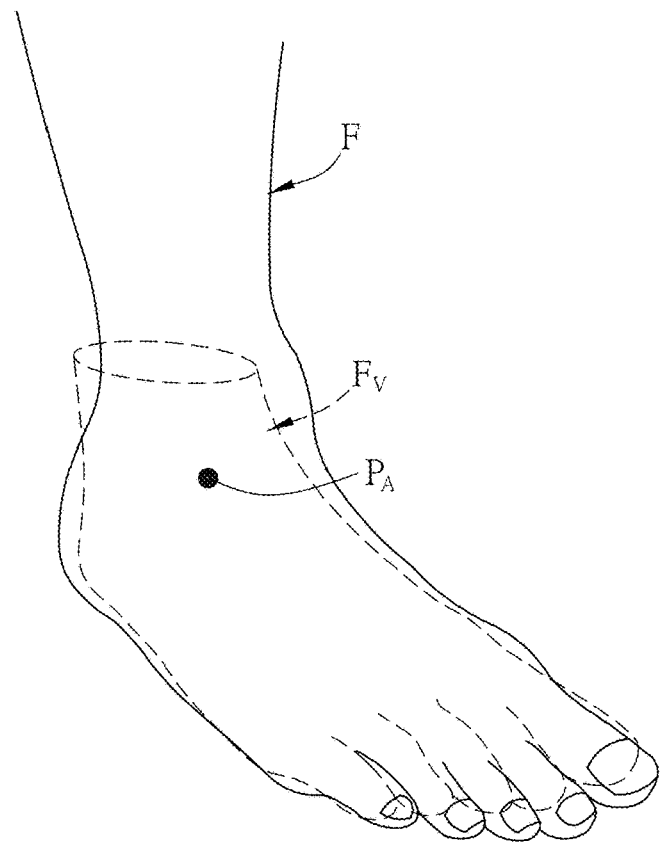
Figure 3C:
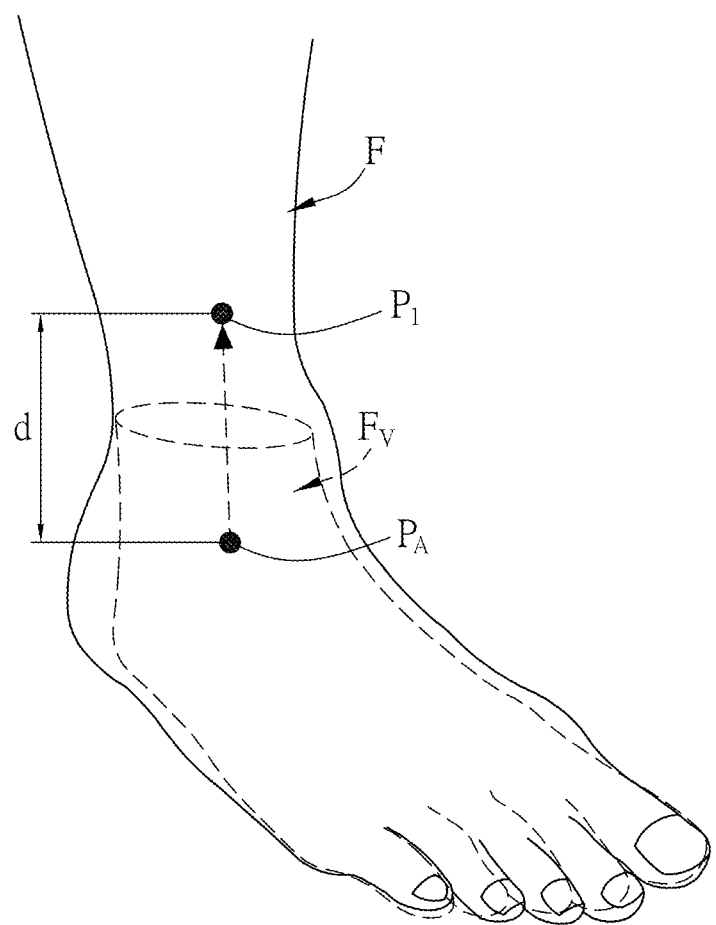

Next, the ankle joint point $P_A$ of the user is defined in the foot image F, and at least a reference point $P_1$ of the foot of the user is defined at a position extending from the ankle joint point $P_A$ toward a direction by at least a distance d, wherein the direction is an extension direction from the ankle joint point $P_A$ to a calf of the user (step S02). In this embodiment, in step S02 of defining the ankle joint point $P_A$ of the user, as shown in FIG. 3B, a virtual foot model $F_V$ may be matched to the user's foot image F to obtain the virtual foot model translation matrix and the virtual foot model rotation matrix of the virtual foot model $F_V$ corresponding to the foot image F, thereby obtaining the position of the user's foot in a spatial coordinate system. Here, the virtual foot model $F_V$ can be matched to the user's foot position (FIG. 3B) by the markerless foot tracking technology (the details can be referred to: Zheng Zhihong, Advanced Research on Virtual Footwear Try-on in Augmented Reality, Department of Industrial Engineering and Engineering Management, Tsinghua University, Master Thesis, 2016). The virtual foot model $F_V$ can be matched to the foot position of different angles according to different angles and positions of the user's foot, and then the virtual foot model translation matrix and the virtual foot model rotation matrix corresponding to the foot angle and position can be calculated so as to obtain the coordinate position of the user's foot in the spatial coordinate system. Since the ankle joint of the virtual foot model $F_V$ is a known coordinate point in the space, the virtual foot model $F_V$ is used as a reference to define the coordinate point of the ankle joint of the virtual foot model $F_V$ in the space coordinate system. The defined coordinate point corresponds to the ankle joint point $P_A$ of the user. Herein, the ankle joint point of the virtual foot model is also the actual ankle joint point ($P_A$) of the user's foot. Then, using the ankle joint point $P_A$ as a reference, the coordinates of the reference point $P_1$ can be obtained by moving from the ankle joint point $P_A$ along the direction extending toward the calf (the upward direction in FIG. 3C, the vertical direction) by a distance of 4-5 cm. The coordinates of the reference point $P_1$ can be provided for subsequent calculations for obtaining the whole depth information of the ankle joint.

Figure 3D:
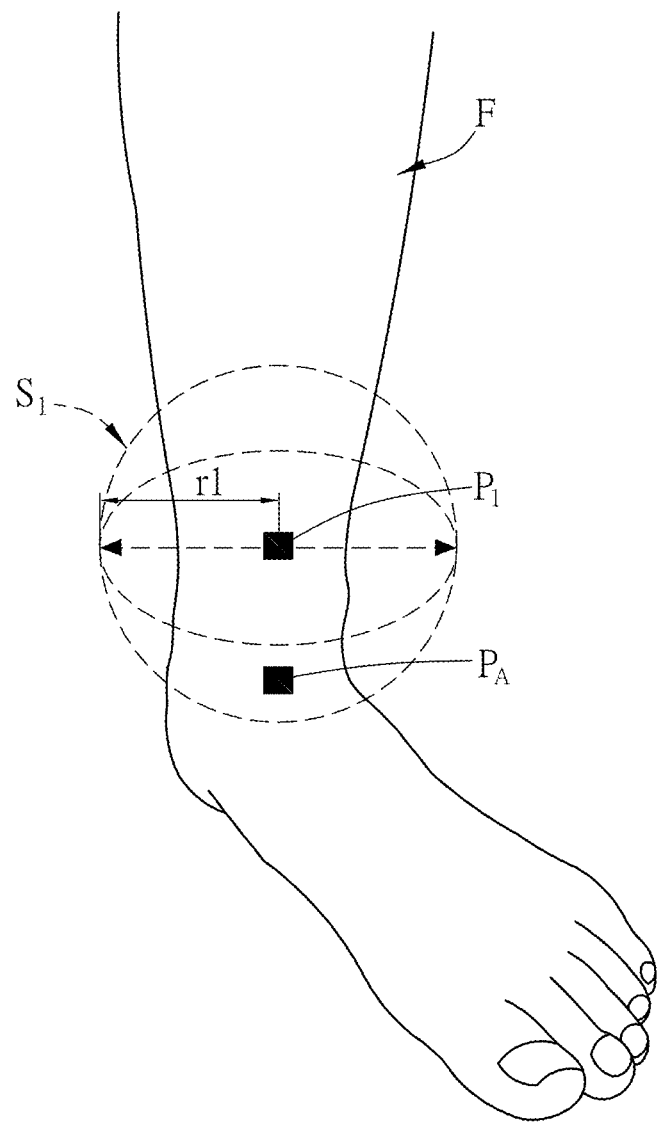

Then, the depth point data $A_d$ within a spatial range around the at least one reference point $P_1$ (taking at least one reference point $P_1$ as the center of the spatial range), and an occlusion model $F_C$ of the user can be established according to the depth point data $A_d$ (step S03). As shown in FIG. 3D, the spatial range can be, for example but not limited to, a sphere $S_1$, and the radius r1 of the sphere $S_1$ needs to be greater than or equal to the distance d, so that sufficient depth points can be obtained subsequently. In this embodiment, the radius r1 of the sphere $S_1$ is, for example, greater than the distance d. Accordingly, the established occlusion model of the user produced a better occlusion processing effect than using the cylindrical model. In some embodiments, the radius r1 is, for example, 120 mm.

Figure 3E:
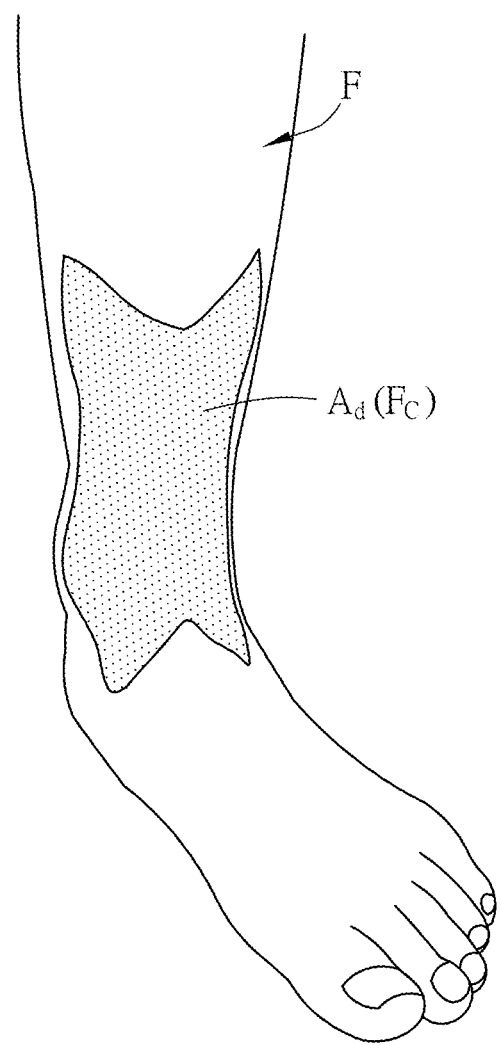

Referring to FIGS. 3D and 3E, in this embodiment, the reference point $P_1$ is used as the center of the sphere $S_1$, and the image capturing device 2 captures the depth point data $A_d$ located within the sphere $S_1$, as shown in the block of FIG. 3E. The depth point data $A_d$ of the block is the depth data around the user's ankle joint. Then, the occlusion model $F_C$ is obtained based on the depth point data $A_d$. Here, the depth point data $A_d$ may be drawn in the spatial coordinates and displayed on the screen by using a drawing function. The black block of FIG. 3E is the position of the captured depth point data $A_d$, and is also the occlusion model $F_C$ of the user's ankle joint portion, which will be closer to the real ankle joint shape of the user than the original cylindrical occlusion model.

Figure 3F:
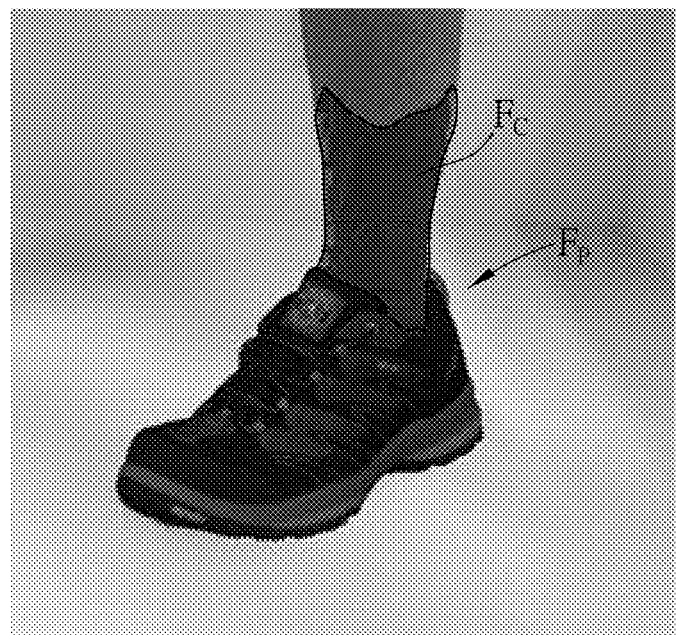

Afterwards, the occlusion model $F_C$ is positioned to the corresponding position of the user's foot image F to obtain an occlusion processed image including the foot of the user (step S04), and a footwear model is positioned to the occlusion processed image to generate the matching image $F_P$ of the footwear model and the user's foot (step S05). Herein, if the user's new foot position and angle are different from the initial foot position and angle during the try-on motion, the aforementioned markerless foot tracking technique can also be used to obtain the virtual foot model translation matrix and the virtual foot model rotation matrix of a new foot position corresponding to the original foot position. Then, the depth points of the new foot position can be obtained so as to reconstruct the occlusion model $F_C$ at the new foot position. As shown in FIG. 3F, it shows that the reconstructed occlusion model $F_C$ is drawn on the ankle and calf portions in the image, and the result of the virtual footwear model being positioned on the occlusion processed image.

To be noted, the footwear model can be pre-stored in the database 4 of FIG. 2B, then the processing unit 31 can retrieve the footwear model from the database 4 and position it into the occlusion processed image. Herein, the database 4 may be located in the memory unit 32 of the electronic device 2, or in the memory of other electronic devices, or in the cloud memory, and this disclosure is not limited.

Figure 1A:
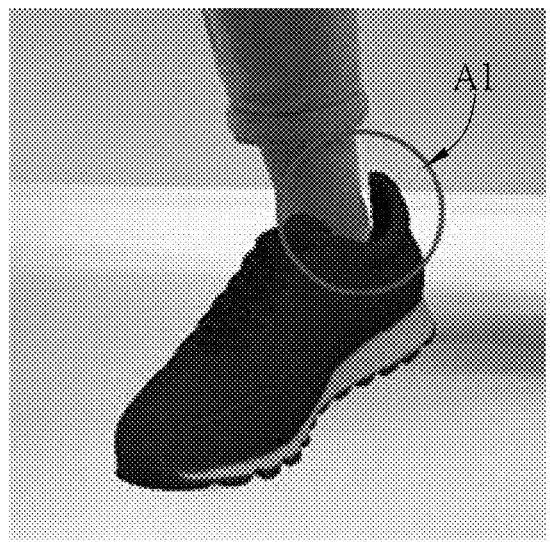
FIG. 1A and FIG. 1B are different schematic diagrams of the occlusion effects of the conventional virtual footwear try-on system.
Figure 1B:
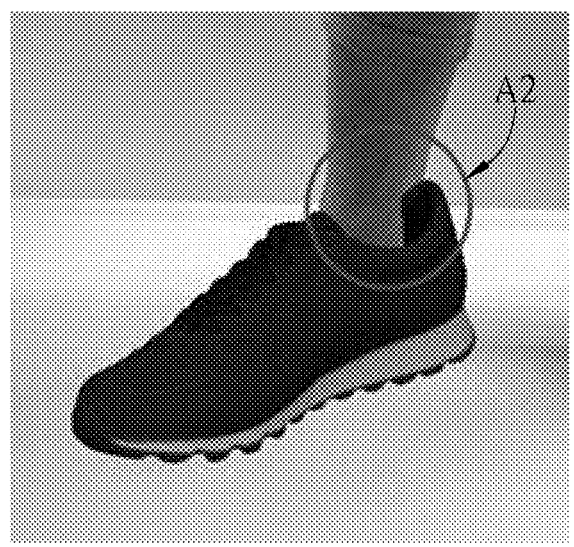
Figure 3G:
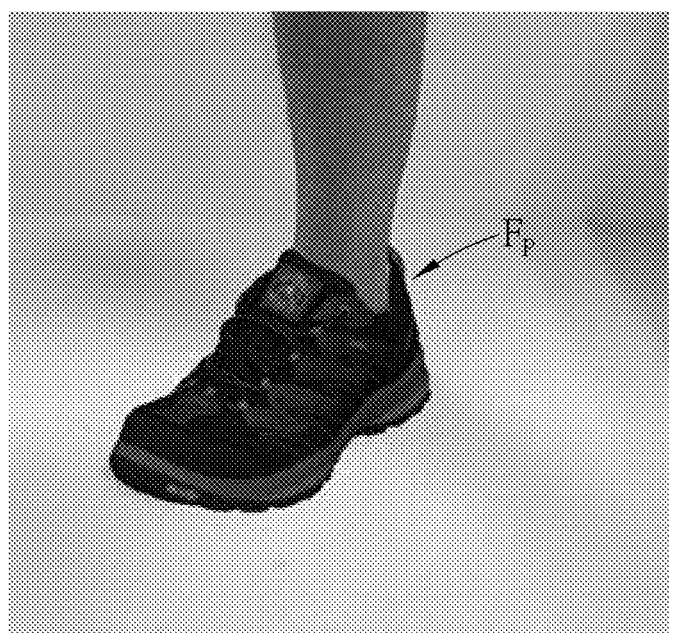

Finally, the occlusion model $F_C$ is hidden according to a relative position (step S06). Only the merge result of the user's foot and the footwear model is displayed, and the result after the occlusion processing is presented as shown in FIG. 3G It can be seen from FIG. 3G that, according to the shading processing result of the foot depth data point cloud of the first embodiment, compared with the masking processing of the conventional FIG. 1A and FIG. 1B, the shading quality of the contact portion between the ankle and the shoe model is improved. The improvement can increase the visual quality of the virtual try-on process with a realistic try-on experience.

Figure 4A:
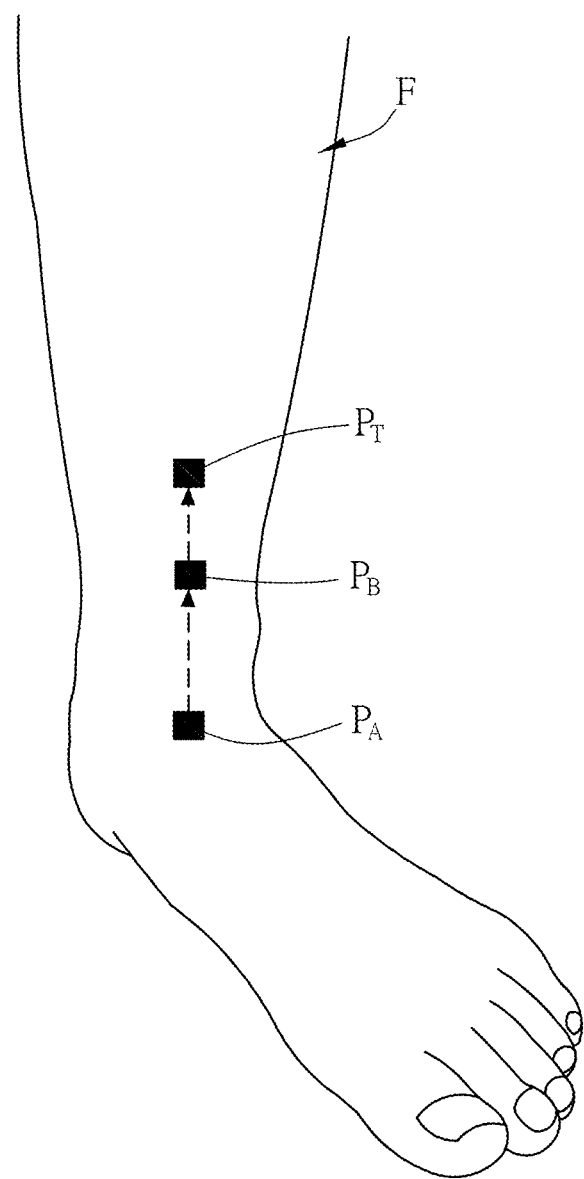
FIGS. 4A to 4Y are schematic diagrams showing the procedures of the method of virtual footwear try-on with improved occlusion processing according to a second embodiment.
Figure 4B:
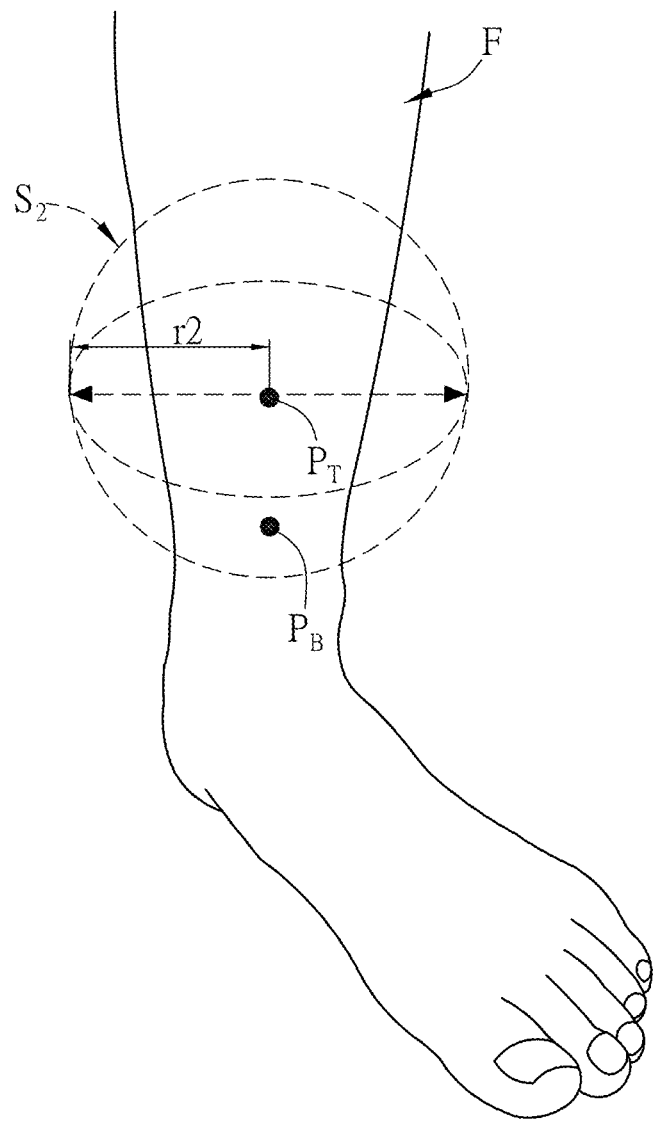
Figure 4C:
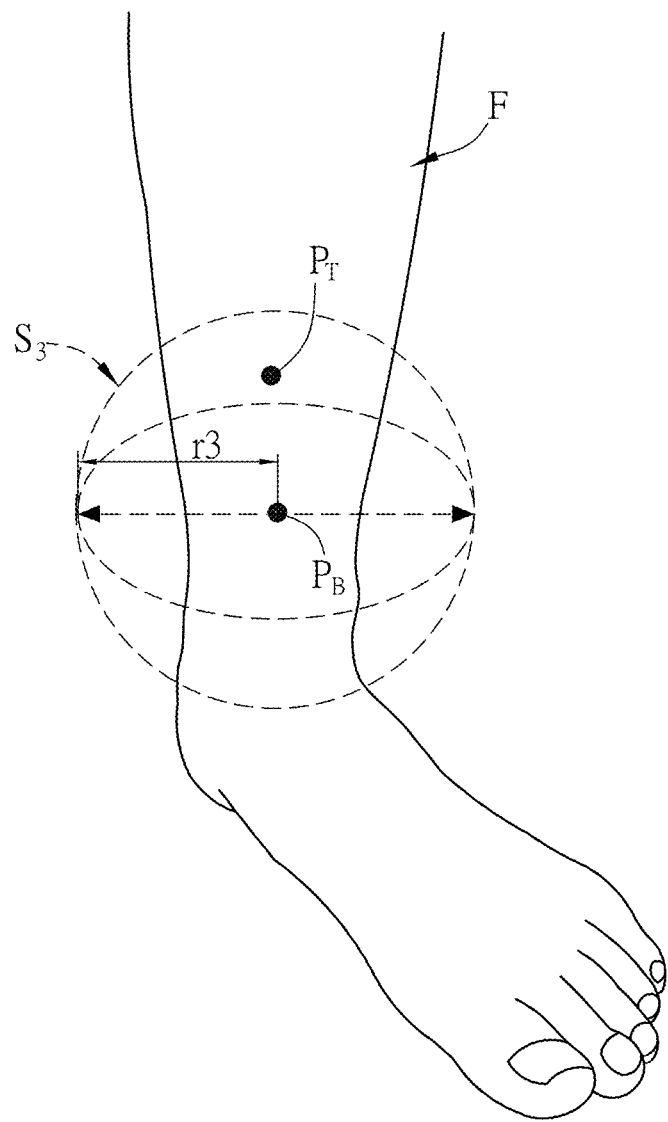
Figures 4D, 4E:
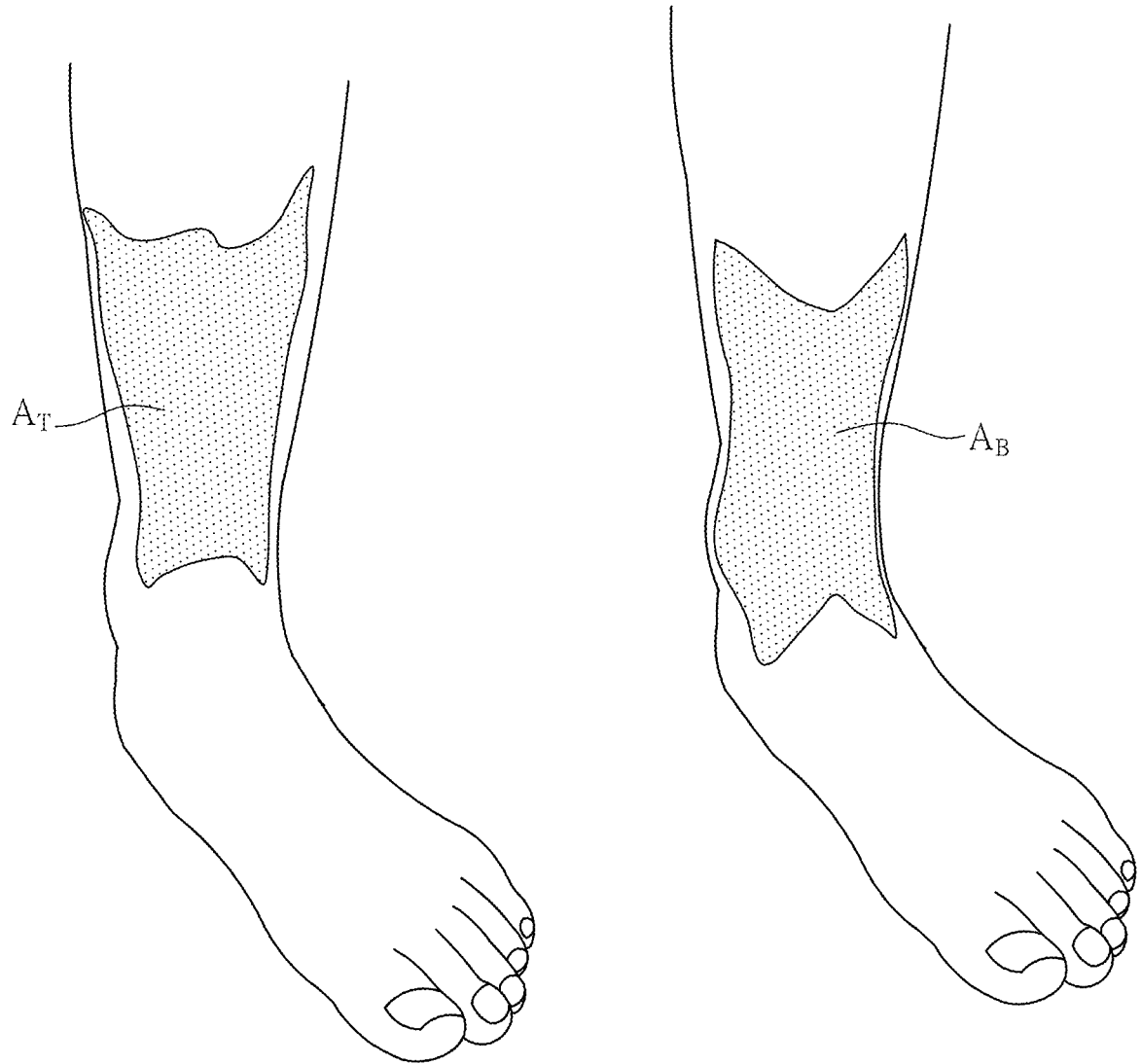
Figure 4F:
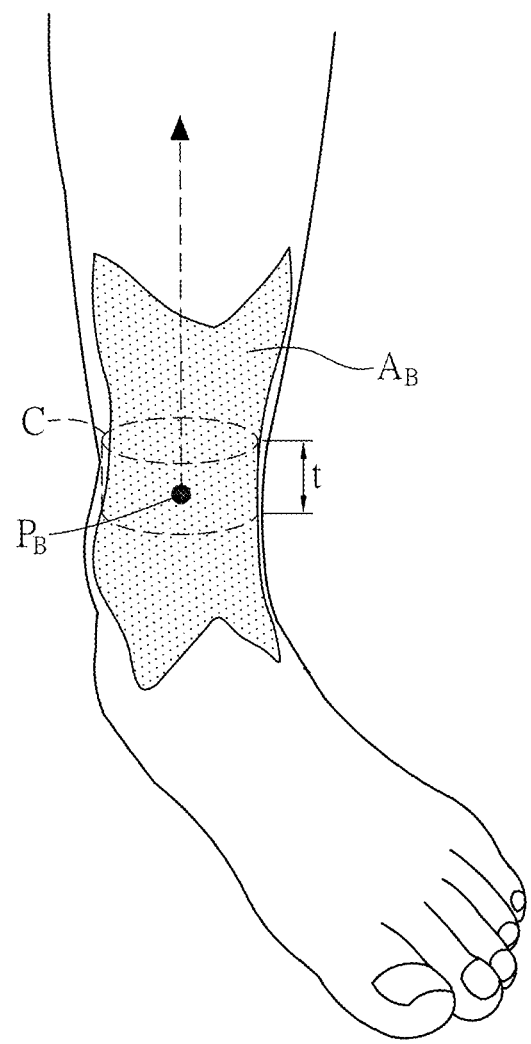
Figure 4G:
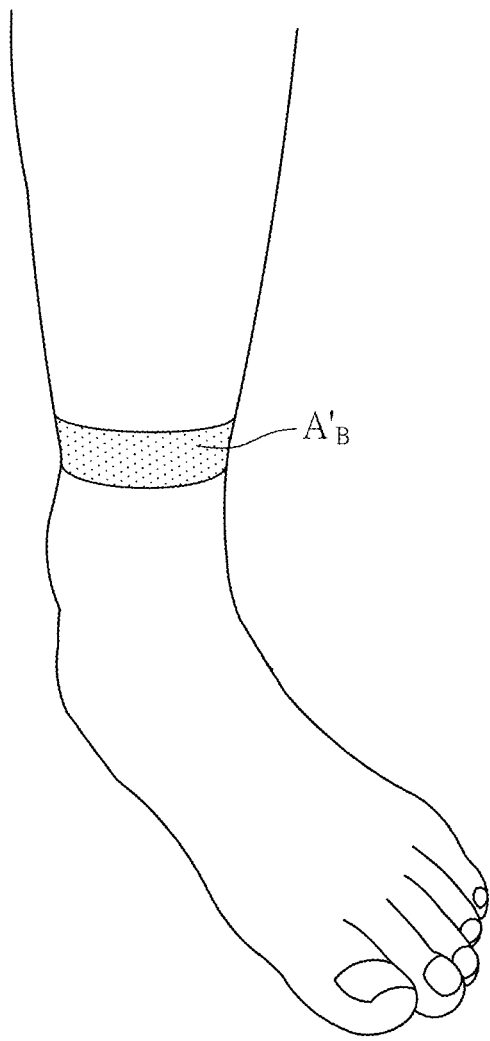
Figure 4H:
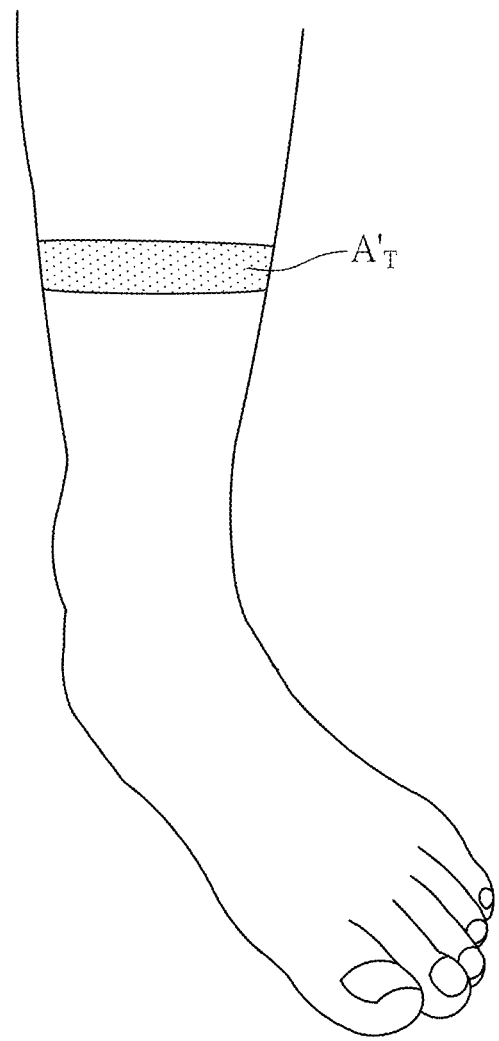
Figure 4I:
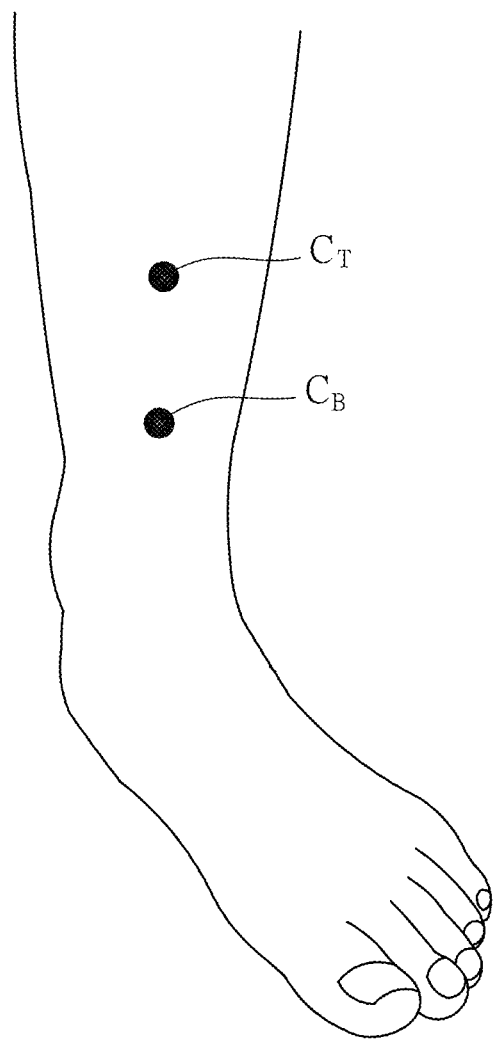
Figure 4J:
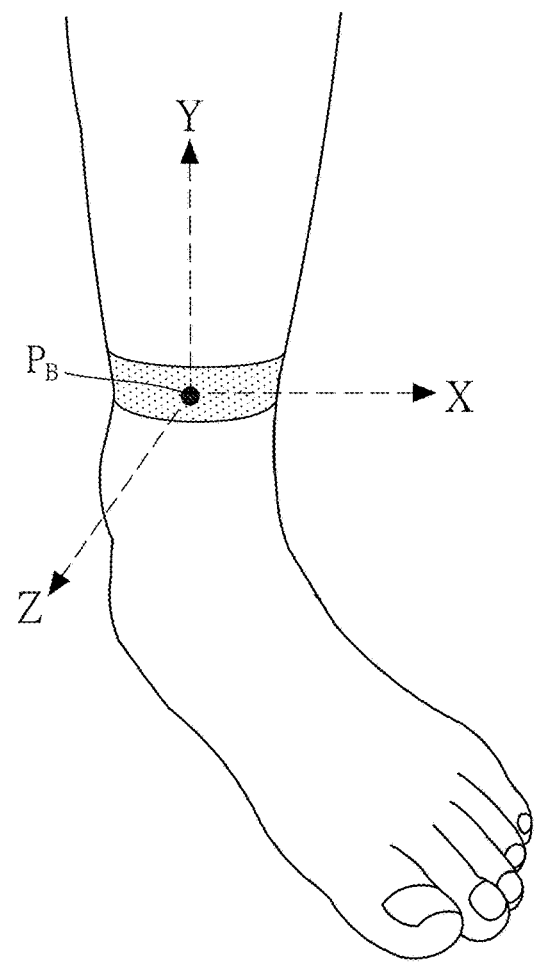
Figure 4K:
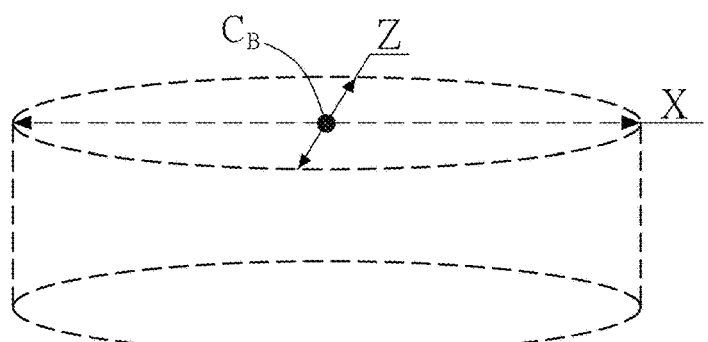
Figure 4L:
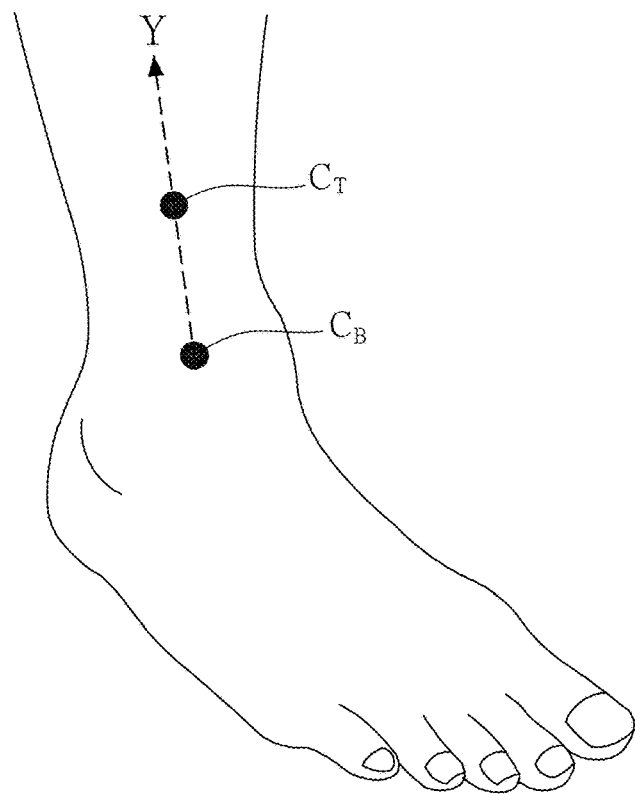
Figure 4M:
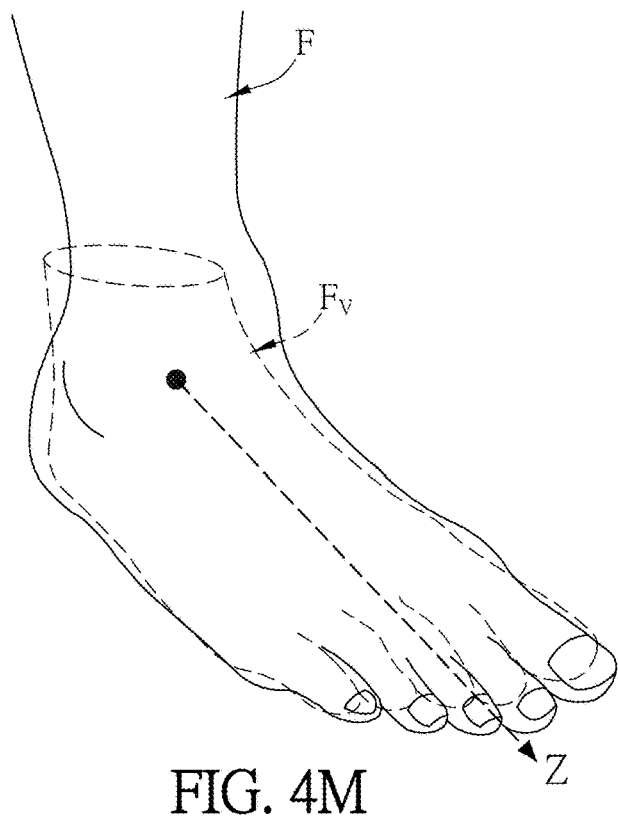
Figure 4N:
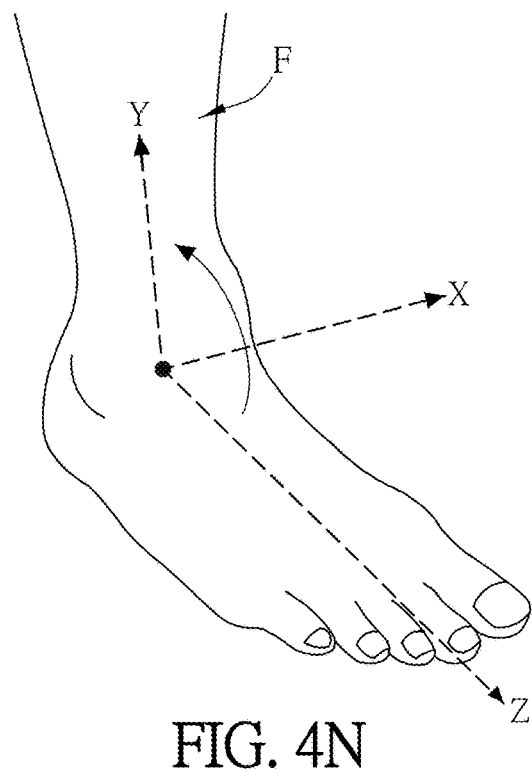
Figure 4O:
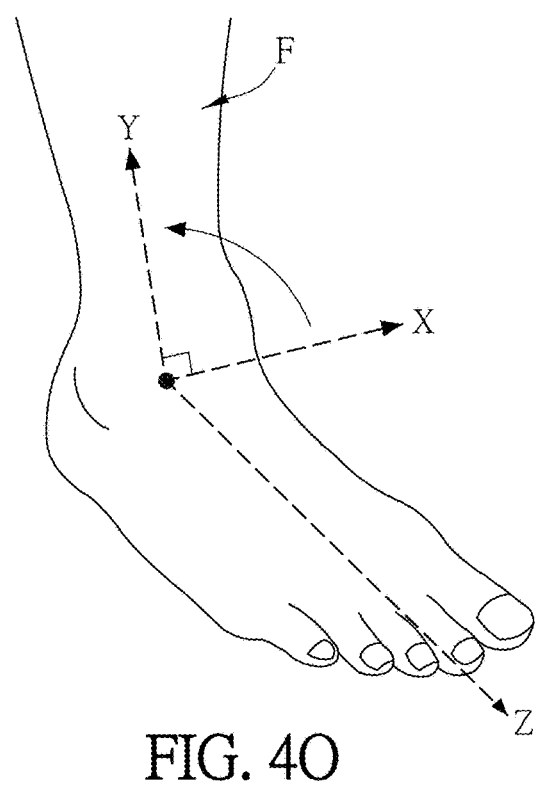
Figure 4P:
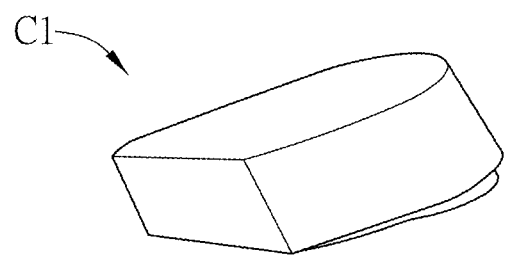
Figure 4Q:
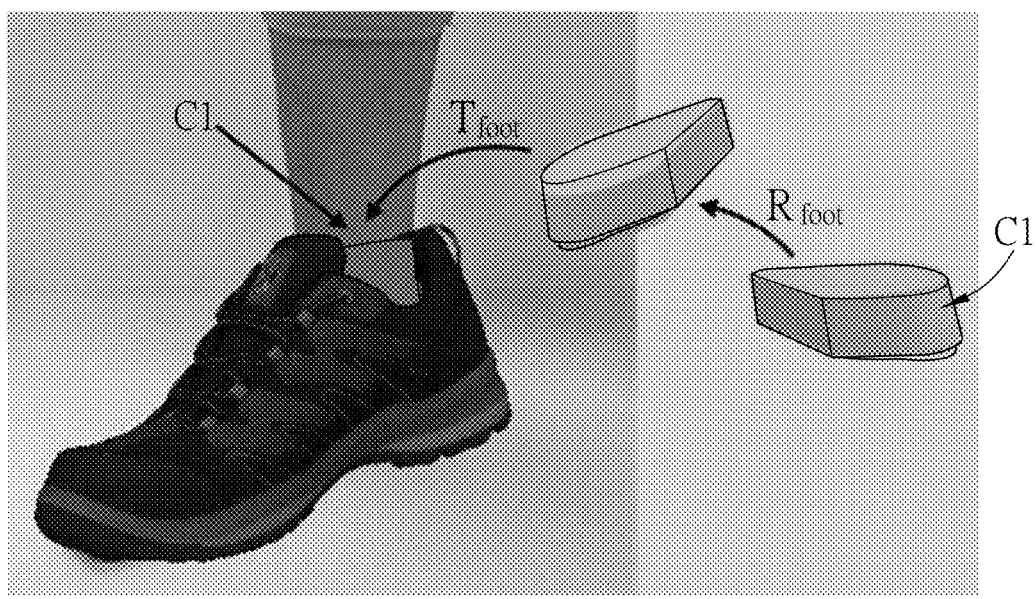
Figure 4R:
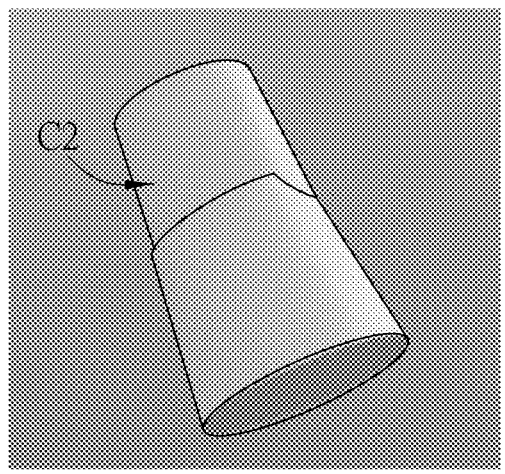
Figure 4S:
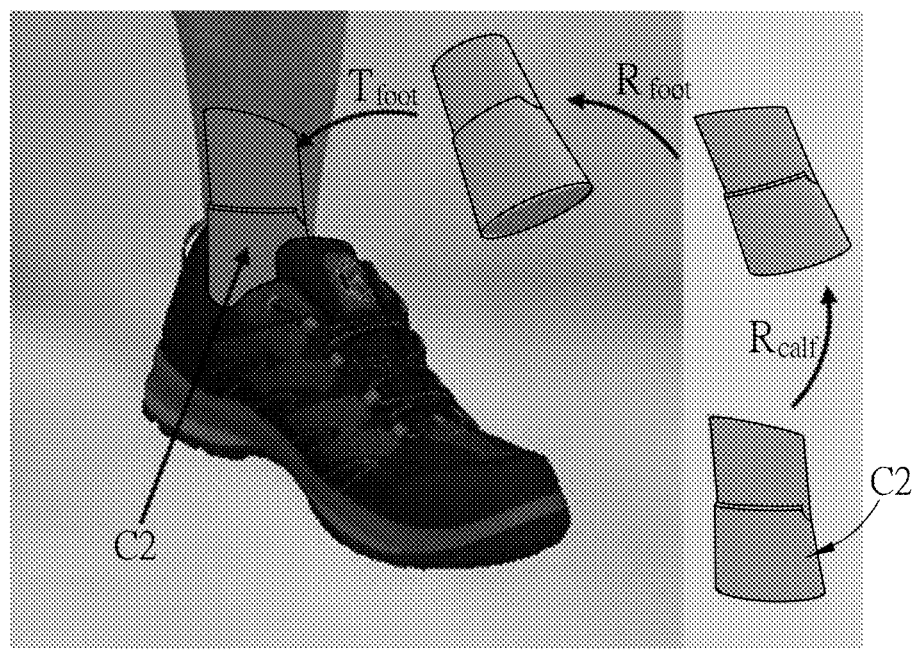
Figure 4T:
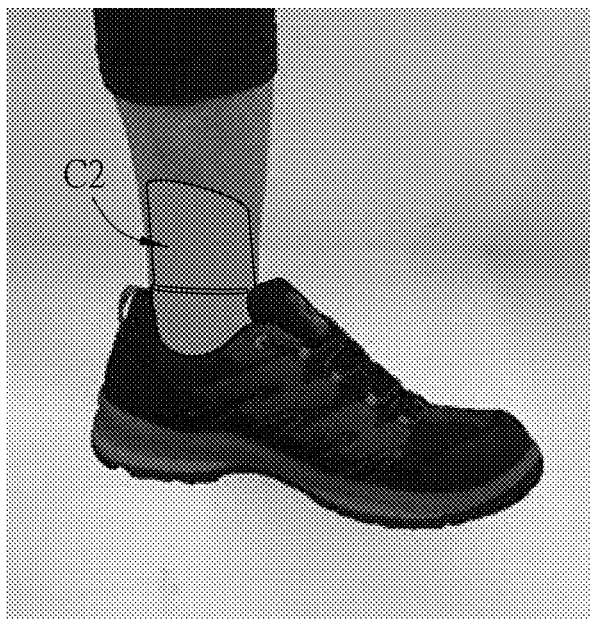
Figure 4U:
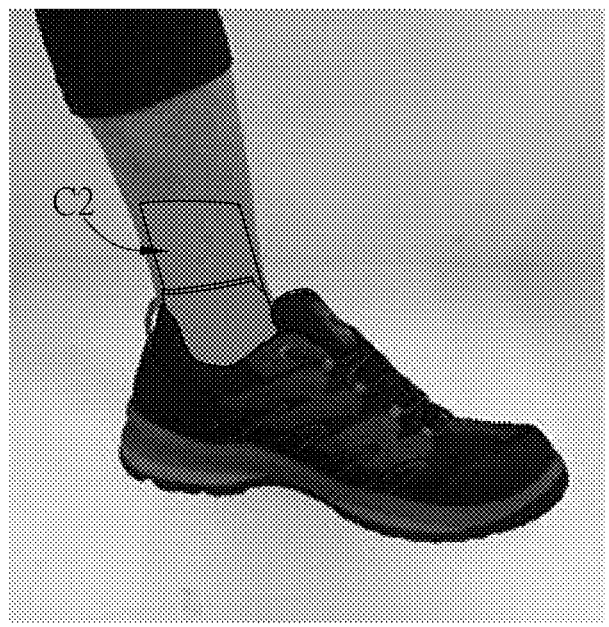
Figure 4V:
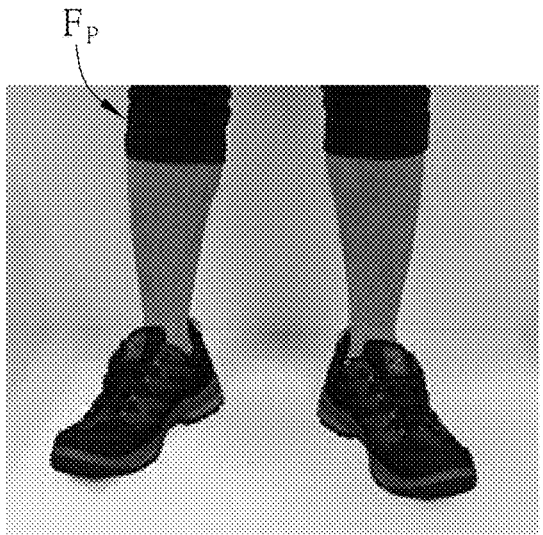
Figure 4W:
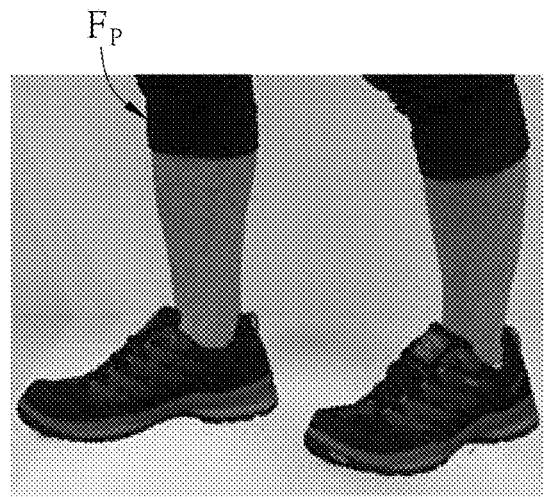
Figure 4X:
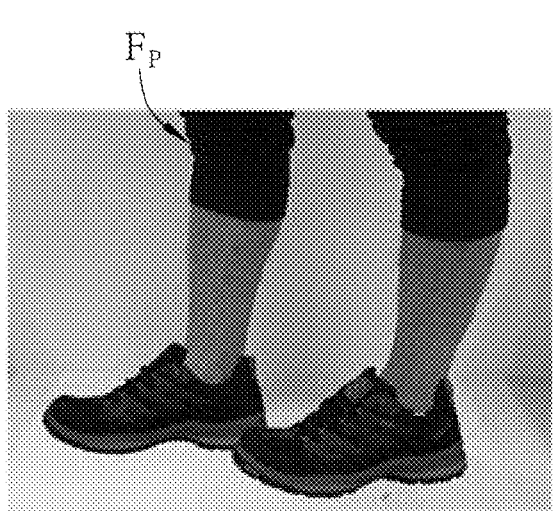
Figure 4Y:
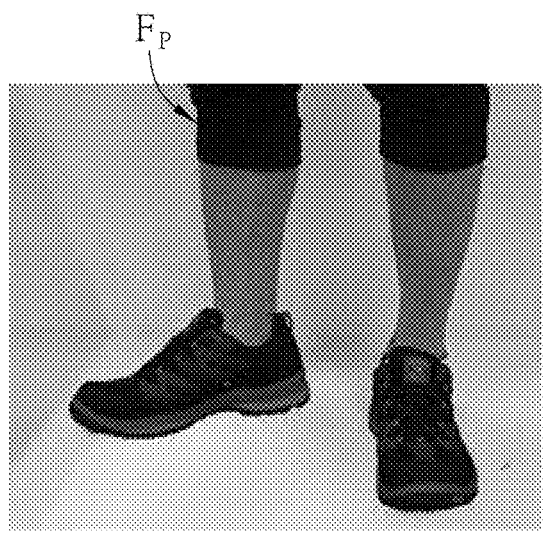

FIGS. 4A to 4Y are schematic diagrams showing the procedures of the method of virtual footwear try-on with improved occlusion according to a second embodiment. Referring to FIGS. 2A and 2B in view of FIGS. 4A to 4Y, the second embodiment shows the occlusion improving method based on the foot depth data regression axis.

In the second embodiment, the first step is to capture a foot image F of a user by the image capturing device 2 (step S01). Then, similar to the first embodiment, the step S02 is performed to define the ankle joint point $P_A$ of the user, and define an upper reference point $P_T$ of the foot of the user at a position extending from the ankle joint point $P_A$ toward the calf of the user by about 4-5 cm and a lower reference point $P_B$ of the foot of the user at a position extending from the ankle joint point $P_A$ toward the calf of the user by about 3 cm. As shown in FIG. 4A, there are two reference points defined in this step S02, including the upper reference point $P_T$ and the lower reference point $P_B$.

Then, the upper reference point $P_T$ and the lower reference point $P_B$ are defined as the center of the upper sphere $S_2$ (FIG. 4B) and the center of the lower sphere $S_3$ (FIG. 4C), respectively. The upper sphere $S_2$ has a radius r2, and the lower sphere $S_3$ has a radius r3. Therefore, the upper reference point $P_T$ is the center of the upper sphere $S_2$, and the lower reference point $P_B$ is the center of the lower sphere $S_3$. The radius r2 of the upper sphere $S_2$ needs to be greater than or equal to the distance between the upper reference point $P_T$ and the lower reference point $P_B$, and the radius r3 of the lower sphere $S_3$ needs to be greater than or equal to the distance between the upper reference point $P_T$ and the lower reference point $P_B$. In this way, sufficient depth point data can be obtained in the subsequent steps, and the obtained depth point data can be used to construct a complete occlusion model for the user, thereby achieving a better occlusion processing effect. In some embodiments, the radius r2 and the radius r3 are, for example, 85 mm.

Next, in the step S03 of constructing the occlusion model, the image capturing device 2 may respectively capture the upper depth point data $A_T$ and the lower depth point data $A_B$ located in the upper sphere $S_2$ and the lower sphere $S_3$, respectively. Herein, the image capturing device 2 captures the depth data as shown in the blocks ($A_T$ and $A_B$) shown in FIG. 4D and FIG. 4E, respectively. In this step, in the depth data obtained in the spheres $S_2$ and $S_3$, not all depth point data are the data needed for the subsequent calculation of the regression axis. Thus, in order to reduce the computational efficiency burden for the unnecessary depth points, it is only necessary to obtain the depth data of a specific part for calculation, such as the depth point in range of the cone C of FIG. 4F, which can be regarded as the depth data point of the cross-section of the calf. Therefore, a part of the upper depth point data $A_T$ and a part of the lower depth point data $A_B$ having a distance away from the upper reference point $P_T$ and the lower reference point $P_B$, respectively, along the direction (the coordinates in the vertical direction) less than or equal to a threshold value t to obtain upper reference point depth data $A'_T$ and lower reference point depth data $A'_B$ as shown in FIGS. 4G and 4H. Herein, the distance is along a vertical direction, which extends from the ankle joint point $P_A$ to the calf of the user.

Afterwards, an upper center point $C_T$ and a lower center point $C_B$ are obtained according to the upper reference point depth data $A'_T$ and the lower reference point depth data $A'_B$ (FIG. 4I), and then the axes of rotation coordinates of the calf of the user can be defined according to the upper center point $C_T$ and the lower center point $C_B$. In this step, the upper reference point depth data $A'_T$ and the lower reference point depth data $A'_B$ (the depth data points of the calf cross-section at different positions) are used to calculate the center point of the calf cross-section to obtain the upper center point $C_T$ and lower center point $C_B$. Hereinafter, the method of calculating the lower center point $C_B$ according to the lower reference point depth data $A'_B$ is described as an example. The calculation method of the upper center point $C_T$ is the same as the described method for calculating the lower center point $C_B$, and the details thereof are not repeated again.

FIG. 4J is a coordinate axis of the calf portion. Herein, the coordinate data of the Y axis is not considered, because the Y axis is a vertical direction, and the values of the coordinate data of the Y axis only represent the upper and lower parts of the calf and have no influence on the calculation. Accordingly, the coordinate values of the Y axis of the center point is not considered. As shown in FIGS. 4J and 4K, the X axis is along a horizontal direction. In the calculation of the lower center point $C_B$, the values of the X axis are needed for calculating the center point of the depth data within the cone range. In this case, the maximum and minimum values of all depth data points in the X axis, which are the leftmost depth data point and the rightmost depth data point, respectively, are calculated. Then, the average of the two data points is calculated and used as the X coordinate of the center point of the calf axis (the lower center point CB). In addition, the Z axis is the direction perpendicular to the X axis and the Y axis, and indicates a front and rear direction. The center point of the Z coordinate can also be calculated by the same method as described above. Therefore, the coordinates of the upper center point $C_T$ and the lower center point $C_B$ can be obtained (FIG. 4I).

To be noted, the image capturing device 2 of this embodiment is a Kinect depth camera for capturing depth data points. Since the Kinect depth camera has limitations in its hardware functionality, the depth data points at the edge of the object may have noises and jitters, so that it is necessary to reduce the noise of the retrieved depth data points in the process of calculating the upper center point $C_T$ and the lower center point $C_B$. In some embodiments, the depth information is unstable at the edge region of the foot, and the noises will reduce the precision of the depth data of the object's edge, decrease the accuracy of calculating the center point of the cross-section of the calf, and thus cause the inaccuracy of the calculated calf axis. Therefore, for example, the depth point data of every 10 frames are averaged, and the extreme depth points far from the average value will be eliminated to reduce the noises and jitters of the depth data points.

After obtaining the upper center point $C_T$ and the lower center point $C_B$, the rotation coordinate axis of the calf portion above the ankle joint of the user's foot can be obtained by calculating according to the upper center point $C_T$ and the lower center point $C_B$. In this embodiment, the axes of the rotation coordinates of the calf portion comprise an X axis, a Y axis and a Z axis. As shown in FIG. 4L, a line from the upper center point $C_T$ to the lower center point $C_B$ is defined as the Y axis, and the OpenGL coordinate system also has the same Y-axis direction. As shown in FIG. 4M, a forward direction of the foot of the user is defined as the Z axis with reference to the position of the virtual foot model $F_V$ in the space obtained by the markerless foot tracking technology (the Z-axis of the OpenGL coordinate system is along the direction of the calf portion). Then, the defined Y axis and Z axis of the calf portion are subject to the cross product to obtain the X axis of the calf portion as shown in FIG. 4N (also the X-axis in the OpenGL coordinate system). However, since the originally defined Y axis and Z axis are not necessarily perpendicular to each other, the standard coordinate axes are constructed for performing the rotation process of the occlusion model in order to make the X axis, the Y axis and the Z axis be perpendicular to each other. In this case, the X axis and the original Y axis are subjected to the cross product to obtain the redefined Z axis as shown in FIG. 4O. Accordingly, the coordinate system with the X axis, the Y axis and the Z axis perpendicular to each other can be created to express the axis directions of the current calf portion.

Finally, a rotation matrix $R_{calf}$ of the current calf axis of the user is calculated, and an occlusion model of the user is established according to the rotation matrix $R_{calf}$ and a translation matrix $T_{foot}$ tracking the position of the user's foot. After obtaining the rotation coordinate axis of the calf portion (FIG. 4O), the rotation matrix $R_{calf}$ indicating that the axis of the calf portion rotates from the original standing posture to the current standing posture is calculated according to the rotation axis, and the obtained rotation matrix $R_{calf}$ can be used to control the rotation direction of the occlusion model. Then, the occlusion model is positioned by using the translation matrix $T_{foot}$ and the rotation matrix $R_{calf}$ of the foot position, which are obtained by tracking the foot position. Finally, the occlusion model is applied to the ankle joint and the calf portion for performing the occlusion processing. In the step SO4 of positioning the occlusion model to the position corresponding to the foot image of the user is performed according to the following equation.

$$P_{after} = T_{foot} * R_{foot} * R_{calf} * P_{before}$$

Wherein, $P_{after}$ is an occlusion model of the current calf axis of the user, $P_{before}$ is an occlusion model of an initial calf axis of the user, $R_{calf}$ is a rotation matrix as a calf axis of the user rotates from an initial standing position to a current position, $R_{foot}$ is a rotation matrix of the foot direction of the user, and $T_{foot}$ is a translation matrix of the foot position of the user.

The occlusion model used in this method is a pre-established virtual model, which can be stored in the database 4 of FIG. 2B, which approximates the geometry of the human ankle and calf, and the occlusion model can include two parts: a first partial occlusion model C1 and a second partial occlusion model C2. As shown in FIG. 4P, the occlusion model is a geometric model of the user's ankle joint and is used to process the block of the junction of the ankle and the footwear (as shown in FIG. 4Q). The angle and position of this block do not change with different user postures while trying on the footwear, or because the axial direction of the calf portion is changed. Thus, the block is fixed at the ankle joint for the occlusion processing. In addition, the second partial occlusion model C2 is a geometric model of the calf portion above the ankle joint of the user. As shown in FIG. 4R, when the user changes posture to try on the footwear, the axial direction of the calf portion will be changed, causing the change of the part of the virtual footwear model and the occlusion processing. Accordingly, the corresponding rotation matrix $R_{calf}$ is calculated based on the coordinate axis of the calf portion obtained in the previous step to determine the current posture and axial direction of the calf portion of the user, and then the calculated rotation matrix $R_{calf}$ is applied to the second partial occlusion model C2 to make the corresponding translational and rotational movements as shown in FIG. 4S. FIG. 4S shows that the second partial occlusion model C2 is positioned in the user's calf portion. In addition, FIG. 4T and FIG. 4U respectively show the changes in the position and the axial direction of the second partial occlusion model C2 when the postures and axial directions of the calf are different.

Finally, the occlusion model is hidden according to the calculation of the relative position so as to obtain the result of vertical footwear try-on with occlusion process. FIG. 4V to FIG. 4Y show the visual effects of the result with improved occlusion of the second embodiment. Herein, the second embodiment has the occlusion processing based on the foot depth data point cloud, and the occlusion quality of the contact portion between the ankle and the footwear model can be significantly improved compared to the conventional occlusion processing of FIGS. 1A and 1B. Accordingly, the second embodiment can enhance the visual quality of the virtual footwear try-on, thus creating a realistic try-on experience.

Figure 5:
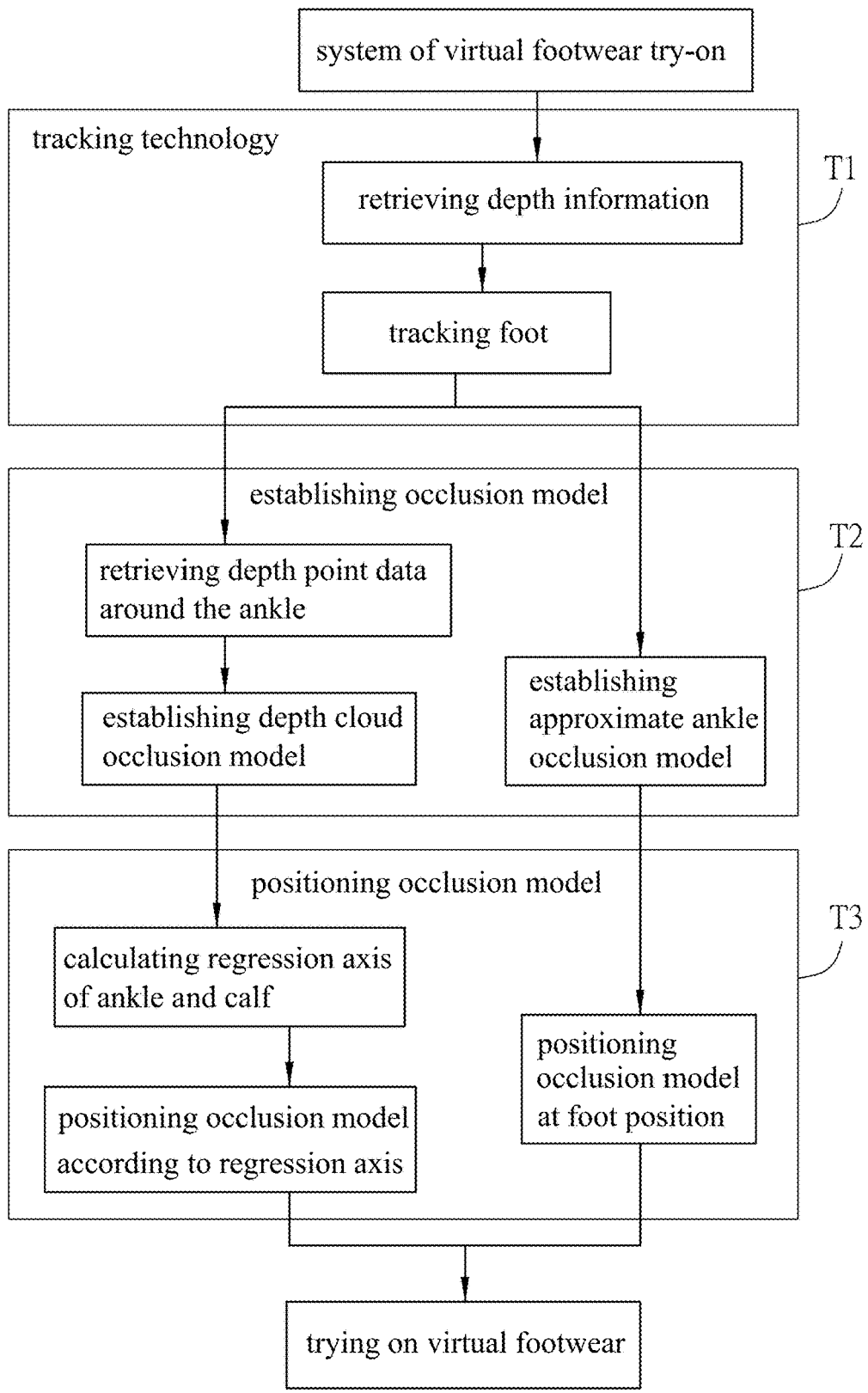
FIG. 5 is a schematic diagram showing the technical architecture of the method and system of virtual footwear try-on with improved occlusion processing of this disclosure.

FIG. 5 is a schematic diagram showing the technical architecture of the method and system of virtual footwear try-on with improved occlusion of this disclosure. As shown in FIG. 5, the method and system of virtual footwear try-on with improved occlusion of the present disclosure can be divided into three major technologies: including tracking technology T1, constructing the occlusion model T2, and positioning the occlusion model T3. In the tracking technology T1, the foot position of the user's body is estimated by, for example, a Kinect depth camera for providing the depth point data and virtual model positioning information required for the try-on system. The occlusion model T2 has two construction ways. One is to construct the occlusion model according to the depth point cloud around the ankle (the first embodiment), and the other is to pre-construct the occlusion model similar to the geometry of the ankle joint and the calf (the second embodiment). To position the occlusion model T3 also has two different methods. One is to position the occlusion model according to the foot position obtained by the foot tracking technology (the first embodiment), and the other is to calculate the regression axis of the calf portion according to the depth data around the ankle and to position the occlusion model according to the regressive axis (the second embodiment). Finally, the virtual footwear is positioned to the foot position to improve the occlusion processing effect.

Comparing the first and second embodiments with the conventional occlusion processing method, it can be found that the conventional occlusion method does not consider whether the occlusion model is similar to the geometry of the user's ankle and calf portion, and the movement of the calf portion may cause the failure of calculating a partial occlusion. However, the occlusion processes provided in the first embodiment and the second embodiment of the present disclosure can significantly improve the occlusion quality of the contact portion between the ankle and the footwear model, thereby improving the visual quality of the virtual footwear try-on experience.

In summary, the method and system of virtual footwear try-on with improved occlusion processing of this disclosure can define an ankle joint point of the user in the foot image, define at least one reference point of the foot of the user according to the ankle joint point, capture depth point data within a spatial range around the reference point, and construct an occlusion model according to the depth point data. Afterwards, the method and system of virtual footwear try-on with improved occlusion of this disclosure further positions the occlusion model to a position corresponding to the foot image, positions the footwear model on the occlusion processed image to produce a matching image of the footwear model and the foot, and hides the occlusion model. Accordingly, the method and system of this disclosure can correctly show the occlusion boundaries of the virtual and real objects, thereby improving the mutual occlusion processing between the virtual footwear model and the ankle joint, increasing the natural interaction between the virtual footwear and the ankle joint, enhancing the visual quality of the virtual footwear try-on experience.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A method of virtual footwear try-on with improved occlusion processing, which is applied to augmented reality, comprising steps of:

capturing a foot image of a user;

defining an ankle joint point in the foot image and defining at least a reference point of the foot of the user by extending from the ankle joint point toward a direction with at least a distance within a range from 4 cm to 5 cm, wherein the direction is an extension direction from the ankle joint point to a calf of the user;

capturing depth point data within a spatial range around the reference point and constructing an occlusion model according to the depth point data, wherein the depth point data includes a plurality of depth data points captured by a depth camera, and the spatial range is a sphere with a radius greater than or equal to the distance;

positioning the occlusion model to a position corresponding to the foot image to obtain an occlusion processed image comprising the foot of the user;

positioning a footwear model on the occlusion processed image to produce a matching image of the footwear model and the foot of the user; and hiding the occlusion model according to a relative position, wherein the reference point comprises an upper reference point being a center of an upper sphere and a lower reference point being a center of a lower sphere, and the step of constructing the occlusion model comprises steps of:

obtaining upper depth point data and lower depth point data from the upper sphere and the lower sphere, respectively;

retrieving a part of the upper depth point data and a part of the lower depth point data having a distance away from the upper reference point and the lower reference point, respectively, less than or equal to a threshold value to obtain upper reference point depth data and lower reference point depth data;

obtaining an upper center point and a lower center point according to the upper reference point depth data and the lower reference point depth data, respectively;

defining axes of rotation coordinates of the calf of the user according to the upper center point and the lower center point; and calculating a rotation matrix of a current calf axis of the user and constructing the occlusion model for the user according to the rotation matrix and a translation matrix for tracking a foot position of the user.

2. The method according to claim 1, wherein the step of defining the ankle joint point in the foot image comprises:

matching a virtual foot model onto the foot image to obtain a virtual foot model translation matrix and a virtual foot model rotation matrix of the virtual foot model corresponding to the foot image, thereby obtaining a position of a foot of the user in a spatial coordinate system; and defining a coordinate point of an ankle joint of the virtual foot model in the spatial coordinate system, wherein the coordinate point corresponds to the ankle joint point of the user.

3. The method according to claim 1, wherein a radius of the upper sphere is greater than or equal to a distance between the upper reference point and the lower reference point, and a radius of the lower sphere is greater than or equal to a distance between the upper reference point and the lower reference point.

4. The method according to claim 1, wherein the axes of the rotation coordinates comprise an X axis, a Y axis and a Z axis, a line from the upper center point to the lower center point is defined as the Y axis, a forward direction of the foot of the user is defined as the Z axis, and the X axis is defined as a direction perpendicular to the Y axis and the Z axis.

5. The method according to claim 1, wherein the step of positioning the occlusion model to the position corresponding to the foot image is performed according to an equation of:

$$A_{fter} = T_{foot} * R_{foot} * R_{calf} * P_{before},$$

wherein, $P_{ater}$ is an occlusion model of the current calf axis of the user, $P_{before}$ is an occlusion model of an initial calf axis of the user, $R_{calf}$ is a rotation matrix as a calf axis of the user rotates from an initial standing position to a current position, $R_{foot}$ is a rotation matrix of the foot direction of the user, and $T_{foot}$ is a translation matrix of the foot position of the user.

6. The method according to claim 1, wherein the occlusion model comprises a first partial occlusion model and a second partial occlusion model, the first partial occlusion model is a geometric model of the ankle joint of the user, and the second partial occlusion model is a geometric model of a calf portion above the angle joint of the user.

7. A system of virtual footwear try-on with improved occlusion processing, which is applied to augmented reality, comprising:

an image capturing device; and an electronic device comprising one or more processing units and a memory unit, wherein the one or more processing units are electrically connected with the image capturing device and the memory unit, the memory unit stores one or more program instructions, and when the one or more processing units execute the one or more program instructions, the one or more processing units perform:

capturing a foot image of a user;

defining an ankle joint point in the foot image and defining at least a reference point of the foot of the user by extending from the ankle joint point toward a direction with at least a distance within a range from 4 cm to 5 cm, wherein the direction is an extension direction from the ankle joint point to a calf of the user;

capturing depth point data within a spatial range around the reference point and constructing an occlusion model according to the depth point data, wherein the depth point data includes a plurality of depth data points captured by a depth camera, and the spatial range is a sphere with a radius greater than or equal to the distance;

positioning the occlusion model to a position corresponding to the foot image to obtain an occlusion processed image comprising the foot of the user;

positioning a footwear model on the occlusion processed image to produce a matching image of the footwear model and the foot of the user; and hiding the occlusion model according to a relative position, wherein the reference point comprises an upper reference point being a center of an upper sphere and a lower reference point being a center of a lower sphere, and in the step of constructing the occlusion model, the one or more processing units are configured to perform:

obtaining upper depth point data and lower depth point data from the upper sphere and the lower sphere, respectively;

retrieving a part of the upper depth point data and a part of the lower depth point data having a distance away from the upper reference point and the lower reference point, respectively, less than or equal to a threshold value to obtain upper reference point depth data and lower reference point depth data;

obtaining an upper center point and a lower center point according to the upper reference point depth data and the lower reference point depth data, respectively;

defining axes of rotation coordinates of the calf of the user according to the upper center point and the lower center point; and calculating a rotation matrix of a current calf axis of the user and constructing the occlusion model for the user according to the rotation matrix and a translation matrix for tracking a foot position of the user.

8. The system according to claim 7, wherein the step of defining the ankle joint point in the foot image comprises:
matching a virtual foot model onto the foot image to obtain a virtual foot model translation matrix and a virtual foot model rotation matrix of the virtual foot model corresponding to the foot image, thereby obtaining a position of a foot of the user in a spatial coordinate system; and
defining a coordinate point of an ankle joint of the virtual foot model in the spatial coordinate system, wherein the coordinate point corresponds to the ankle joint point of the user.

9. The system according to claim 7, wherein a radius of the upper sphere is greater than or equal to a distance between the upper reference point and the lower reference point, and a radius of the lower sphere is greater than or equal to a distance between the upper reference point and the lower reference point.

10. The system according to claim 7, wherein the axes of the rotation coordinates comprise an X axis, a Y axis and a Z axis, a line from the upper center point to the lower center point is defined as the Y axis, a forward direction of the foot of the user is defined as the Z axis, and the X axis is defined as a direction perpendicular to the Y axis and the Z axis.

11. The system according to claim 7, wherein the step of positioning the occlusion model to the position corresponding to the foot image is performed according to an equation of:

$$P_{after} = T_{foot} * R_{foot} * R_{calf} * P_{before},$$

wherein, $P_{after}$ is an occlusion model of the current calf axis of the user, $P_{before}$ is an occlusion model of an initial calf axis of the user, $R_{calf}$ is a rotation matrix as a calf axis of the user rotates from an initial standing position to a current position, $R_{foot}$ is a rotation matrix of the foot direction of the user, and $T_{foot}$ is a translation matrix of the foot position of the user.

12. The method according to claim 7, wherein the occlusion model comprises a first partial occlusion model and a second partial occlusion model, the first partial occlusion model is a geometric model of the ankle joint of the user, and the second partial occlusion model is a geometric model of a calf portion above the angle joint of the user.

* * * * *